(12) United States Patent
Feher et al.

(10) Patent No.: US 6,787,744 B1
(45) Date of Patent: Sep. 7, 2004

(54) MICROWAVE DEVICE FOR DE-ICING, OR KEEPING HOLLOW BODIES FREE FROM ICE AND METHOD FOR THE OPERATION OF THE DEVICE

(75) Inventors: Lambert Feher, Linkenheim-Hochstetten (DE); Arno Pabsch, Braunschweig (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 10/684,130

(22) Filed: Oct. 10, 2003

Related U.S. Application Data

(63) Continuation-in-part of application No. PCT/EP02/02842, filed on Mar. 14, 2002.

(30) Foreign Application Priority Data

Apr. 11, 2001 (DE) .......................................... 101 18 121

(51) Int. Cl.[7] .............................. H05B 6/80; B64D 15/12
(52) U.S. Cl. ........................ 219/679; 219/703; 219/761; 219/757; 244/134 R; 244/134 D
(58) Field of Search ................................. 219/678, 679, 219/703, 761, 715, 757; 244/134 R, 134 D

(56) References Cited

U.S. PATENT DOCUMENTS 5,061,836 A * 10/1991 Martin ....................... 219/759
5,615,849 A    4/1997 Salisbury ................. 244/134 R
6,610,969 B2 *  8/2003 Feher ........................... 219/679
6,642,490 B2 * 11/2003 Feher ........................... 219/679

FOREIGN PATENT DOCUMENTS

DE      197 50 198    5/1999
WO      WO 98/01340   1/1998

* cited by examiner

Primary Examiner—Philip H. Leung
(74) Attorney, Agent, or Firm—Klaus J. Bach

(57) ABSTRACT

A microwave device for de-icing and keeping areas of hollow body structures free from ice keeps atmospherically exposed leading edges and adjacent areas free of ice by means of a coolant circuit. The surface segments between the adjacent areas are kept free from ice as a result of the effects of a microwave device on the wall of the surface segments and the heating that occurs by the exposure to microwave radiation. A series of consecutive microwave-tight chambers is disposed behind the wall of the exposed area. A microwave source supplies microwaves to the chambers with the aid of a decoupling structure disposed therein, resulting in high/multimode excitation. The waste heat of the microwave sources is collected by means of a coolant circuit and transported to the r areas adjacent the leading edge for permanent heating in order to keep the surfaces free from ice. The microwave sources are cyclically operated.

9 Claims, 4 Drawing Sheets

MICROWAVE DEVICE FOR DE-ICING, OR KEEPING HOLLOW BODIES FREE FROM ICE AND METHOD FOR THE OPERATION OF THE DEVICE

This is a Continuation-In-Part application of international application PCT/EP02/02842 filed Mar. 14, 2002 and claiming the priority of German application 101 18 121.3 filed Apr. 11, 2001.

BACKGROUND OF THE INVENTION

The invention relates to a microwave-technical installation for keeping free of ice, and de-icing, form-stable hollow body structures, whose surfaces are exposed to meteorological influences and which must be kept free of ice at least in certain areas which are exposed to flowing air, particularly the leading edges of airplane wings.

The formation of ice on such structures detrimentally affects the airflow and the type of flow which, particularly in aeronautics, may lead to aerodynamically problematic situation and even to uncontrollable airplane behavior.

Countless efforts have been made to keep exposed structures subject to icing ice-free. They include spraying such surfaces or flushing them with a liquid, which inhibits the formation of ice, conducting hot air over the inner surfaces of such structures and electrically heating such areas by way of metal nets installed in the walls of such surfaces.

It is necessary that ice formation on these surfaces be prevented. Deicing by means of liquid is effective only temporarily. The film of deicing liquid adhering to the surfaces is rapidly peeled off with strong airflow around the surfaces. Also rain will wash off de-icing liquid in a short time.

In lightweight construction, increasingly hollow bodies or shell structures of prepreg, CFK and GFK composite parts are used, generally fiber-reinforced materials with additives which improve the material properties for particular applications. However, although these composite materials are rigid and form-stable and also have a high mechanical strength, they have, in comparison with metal, a very low an-isotropic thermal conductivity so that, if heated by exposure to hot air from the inside, they may be over-heated resulting in localized delaminations. As a result, the capability of providing a power density for heating the outer surfaces sufficient to prevent potential icing is highly limited.

DE 100 16 261 discloses a compact microwave system for deicing surfaces or preventing, the formation of ice on surfaces of hollow shell structures which are exposed to meteorological influences. The hollow shell structures consist of cured compounds of thermoplastic or duroplastic materials with dielectric properties. The system includes at least one microwave source whose power output is controllable, and which is operated in a pulsed or continuous manner by way of a hollow conductor and uncoupling system, which is flanged to the microwave source. Energy is radiated out of the microwave source through the conductors monochromatically in the frequency range of 900 MHz to 20 GHz. At least the front area of the respective structure, which is susceptible to icing is of laminated design and consists of a body forming a support structure of dielectric compound material having shear-pressure and torsional stability adapted to the load requirements. In combination with the adjacent structures with metallic surfaces, with which the support structure is electrically connected, a metal-enclosed hollow space is formed.

In the hollow space or in chambers within each of such a formed body an individually operated microwave system is installed which consists of a microwave source with a power supply and an uncoupling arrangement comprising hollow conductors and an uncoupling structure. The uncoupling structure extends within the formed body along the front edge thereof in such a way that the uncoupled microwaves reach the free inner surface of the compound material with a single or almost a single wave front. The microwave than penetrates the compound material and heats the front area of the compound material volume by microwave interaction. Heating occurs in such a way that, under the influence of the microwaves, the compound material temperature remains at any point far below the delamination temperature of 130° C. and can easily withstand a predetermined area power density of up to 60 kW/m$^2$ at the interface of the formed body and the metal skin when clear ice is present on the surface. As a result, the metal skin can be kept at a predetermined temperature—depending on the meteorological requirements—of 0° C. to 70° C. providing for an ice-melting capability at which no ice can form on the front edges when the microwave de-icing system is energized.

It is the object of the present invention to provide a simple, compact and de-centralized de-icing system for hollow body or shell structures which are exposed to atmospheric air flow.

SUMMARY OF THE INVENTION

A microwave device for de-icing and keeping areas of hollow body structures free from ice keeps atmospherically exposed leading edges and adjacent areas free of ice by means of a coolant circuit. The surface segments between the adjacent areas are kept free from ice as a result of the effects of a microwave device on the wall of the surface segments and the heating that occurs by the exposure to microwave radiation. A series of consecutive microwave-tight chambers is disposed behind the wall of the exposed area. A microwave source supplies microwaves to the chambers with the aid of a decoupling structure disposed therein, resulting in high/multimode excitation. The waste heat of the microwave sources is collected by means of a coolant circuit and transported to the r areas adjacent the leading edge for permanent heating in order to keep the surfaces free from ice. The microwave sources are cyclically operated.

With the surface segments, the ribs and struts in the interior of such a hollow body structure, chambers are formed along the front edge of the body structure, which are sealed with respect to each other in a microwave-tight manner by a metallic skin or microwave-tight metal net or because the rib sections and the respective strut sections are metal-coated or consist of a suitable metal structure such as stainless steel or hard aluminum. The hollow conductor uncoupling structure is attached in each chamber at the inside to the strut so as to extend parallel to the front edge of the hollow body. It is flanged to the respective microwave source through the wall of the strut. The geometry of the chambers and the frequency of the microwave which is between 900 MHz and 25 GHz are so selected that in each chamber, upon energization of the respective microwave source, an electromagnetic field with over-modulation, that is with many possible modes, is generated. As a result, the microwave penetrates, in accordance with the over-modulation, into the wall of the fiber-reinforced compound material CFK or GFK of the surface segment with equal or almost equal area power density and heats the wall in accordance with the electrical conductivity. Because the outer surface segment is shielded by a metal skin, the microwaves cannot escape as the chamber as a whole is microwave tight.

Along the front edges and along the outer hollow body and the end of the surface segment extending therefrom at least up to the strut, metallic double conductors of an electrically well conductive material extending up to at least the strut are installed in the area which is to be kept ice free along the edge exposed to the air. These straight double lines are joined by hoses to the microwave sources or, respectively, the cooling channels thereof so as to form a cooling circuit in such a way, that, within the double conductors, a counter current is established and the microwave sources are subjected to the gas flow one after the other. For the stationary operative of the microwave sources, the temperature along the double lines remains constant the heat being derived solely from the waste heat of the microwaves. Each coolant circuit may be connected to another heat source in order to provide for redundancy of such a system.

The invention also resides in a method of operating a microwave system for a de-icing arrangement according to the invention. One procedure resides in continuously keeping the line structure in the area of the outwardly directed exposed surface of the hollow space structure free of ice by means of the double lines mounted in the wall. With the cooling circuit arrangement a counter current flow is obtained in the double line area, that is the flow in the two lines is in opposite directions and a series flow arrangement for the heat sources that is the microwave sources from that area, through which coolant is pumped, is obtained.

The microwave sources of a particular area are operated in a cyclical manner. That means that a particular microwave device is switched on for an adjustable period while others are not. The procedure is such that, between two energized microwave sources, there is always one, which is switched off. Depending on the number of the microwave sources, the cycle time is given as a result of the necessary on and off time of each microwave source.

The individual cycle-time of a microwave source for a certain area can be coupled with that of other areas to a supervisory cycle time by adding the individual cycle times, such that a time-sequential operation can be established, or that the microwave sources are operated independently of each other, which provides for a time-simultaneous operation. Also, a group-type simultaneous operation may be provided for. However, this is a control matter and depends on the heat requirement.

During an individual cycle period consequently at least one microwave source is energized in such an area and generates heat for heating the lines. In the neighborhood of the double lines, it is adjustably warm during a cycle period by adjusting the efficiency of the microwave source, which is variable within limits and based on the size of the microwave de-icing arrangement, so that the line structure can be kept free of ice. Also, any ice layer possibly present on a surface segment in this area of the hollow body structure, which has already been partially liquefied in the interface area with the hollow body may have already been ripped off by the airflow from the surface or it is further liquefied. The areas between the lines may consequently ice up for short periods. Therefore the line areas of such an area which are always free of ice are always so dimensioned, that the areas in between can always be rapidly and safely de-iced by microwaves.

During the cycling period for a particular area the microwave sources can be controlled so that they are constantly fully energized when they are switched on or they are energized in a pulsed fashion when the heat requirements are lower. In this way, in a simple manner, the operation of the microwave source can be adjusted to the heat requirements and this operation can be controlled with the aid of temperature and ice sensors by way of data processing equipment.

Generally, the hollow conductor uncoupling structure extending over the length of the chamber has a round cross-section. But it may also have a rectangular cross-section whereby an over-modulation, that is, the occurrence of many modes beginning with the base mode can be initiated in the chamber.

As microwave sources magnetrons, klystrons, backward-wave oscillators (BWO) or extended interaction oscillators (EIO) or even gyrotrons and also klystrons may be used. The selection is determined by the technical requirements and the price acceptable for such a de-icing structure. Often, also the weight of the equipment is an important consideration.

Reference is made at this point to a protective device commonly used in engineering considerations, which is a circulator. If this device is arranged between the microwave source and the uncoupling structure to the ambient or to a resonator back travel waves returning to the microwave source are suppressed and damage to the microwave source resulting therefrom is prevented. Such a device is required particularly if the installation is not very well tuned. This however involves additional technical and monetary expenses and also increases the weight of the system. It is noted that such a device is not needed in the arrangement according to the invention since the arrangement according to the invention is designed to be well tuned, that is, adapted to the impedance so that such a protective device is not necessary and the corresponding expenses are eliminated. However, such a protection device may still be installed in the arrangement according to the invention.

In order to permit the transfer of the heat along the double lines into the wall of the hollow body structure with little resistance, the lines consist of a material with good heat conductivity such as copper or brass and possibly also stainless steel. The cross-section of these lines may be round or polygonal. The selection depends on the design and manufacture of the hollow body structure. The round cross-section is technically most appropriate however, triangular, rectangular or hexagonal cross-sections are also common.

The design that is the power output of the microwave source and distribution structure is so selected that sufficient energy can be provided for a fast melting of an ice layer on the surface of the structure to be handled by the microwave source. At an efficiency of between 0.4 and, at the most, 0.8 the microwave source also produces heat, which is carried away by the coolant of the cooling system of the microwave source and which is supplied to the line-area use locations. A coolant circuit includes at least the double lines and the microwave sources associated with an area to be maintained free of ice.

The waste heat of the microwave sources is utilized in a controlled manner and is not discharged to the environment unutilized. If the coolant in the cooling circuit cannot be circulated alone by the temperature gradient, a coolant circulating pump is installed in the cooling circuit and the pump is at least initially operated. When coolant circulation has been established the pump may continue to run in a passive manner.

To comply with redundancy requirements, the cooling circuit may be connected with its serially connected heat/ microwave sources by way of valves to other heat sources. However, this measure is well known.

The microwave power output leaves the uncoupling structure with little attenuation and heats the shell structure exposed to the atmosphere, which shell structure represents a dissipative resonator of low quality, uniformly in a certain area with a predetermined time cycle and continuously along a predetermined linear area by the waste heat of the respective microwave source used for that area. The microwave de-icing structure can be installed in a simple manner directly at the location that is in the respective hollow body structures. Then, the microwave distribution structure is limited to the uncoupling structure and a short connecting duct between the microwave source and the uncoupling structure. The power supply for groups of microwave sources for the area to be kept free of ice is arranged centrally. From the power supply, only high-tension power cables extend to the various microwave sources.

Also, a cooling circuit includes at least one group of a series of microwave sources, which are arranged in the cooling circuit in series and whose cooling coils serve as heat sources for the coolant. A central circulating pump circulates the coolant.

The hollow body structures, which are to be kept free of ice, may be components of airplanes of ships of a train or a motor vehicle or even the rotor blades of a wind power plant or other structures, which are subjected to meteorological conditions.

The microwave-technical de-icing arrangement may be used in many technical apparatus, which in some way are subjected to atmospheric conditions. They may be used on the ground as well as in aeronautics and in aviation safety.

Below, the invention will be described in greater detail on the basis of an exemplary use in the hollow body structure of an elevator and a rudder of an airplane with reference to the accompanying drawings.

DESCRIPTION OF A PREFERRED EMBODIMENT

The microwave sources must be sufficiently powerful so as to provide, by way of the uncoupling structures in the chambers or hollow spaces, such a multi-or over-mode electromagnetic field that, with the electromagnetic waves entering the wall of the surface segment, the interface between the surfaces of the segments and any ice layer formed thereon is melted for in weather conditions and temperatures that can be expected. Based on this premise, the electrical properties—requirements—for the hollow body wall and the necessary multi-mode conditions in the respective chamber, the needed microwave power output is determined and the microwave source is selected accordingly. Since a large selection of sources is available, it is pointed out here, that the frequency should be in the range of 900 MHz to about 25 GHz in which the selected source should operate. Based on the efficiency of such microwave sources, which is generally between 0.35 and 0.8, also the available waste heat generated by each microwave source is determined. The wall of the elevator and the rudder consists, at least in the areas to be kept free of ice, of a reinforced fiber compound material. In aeronautics, carbon fiber compound materials, CFK are used for that purpose. They have a certain electric conductivity so that the entering microwave couples to these materials. Other fiber compound-materials may be made electrically conductive by the admixture of certain additives during the manufacture.

In aeronautics high temperature gradients between the surface areas exposed to the air and the apparatus in the interior of the hollow body structure occur. The cooling arrangement for the heat source operates similar to an arrangement for generating warm water in a coffee machine: The cold liquid coolant is heated and propelled. If the heat is sufficient the coolant circulates naturally if there are no or only little flow restrictions or friction.

Figure 1:
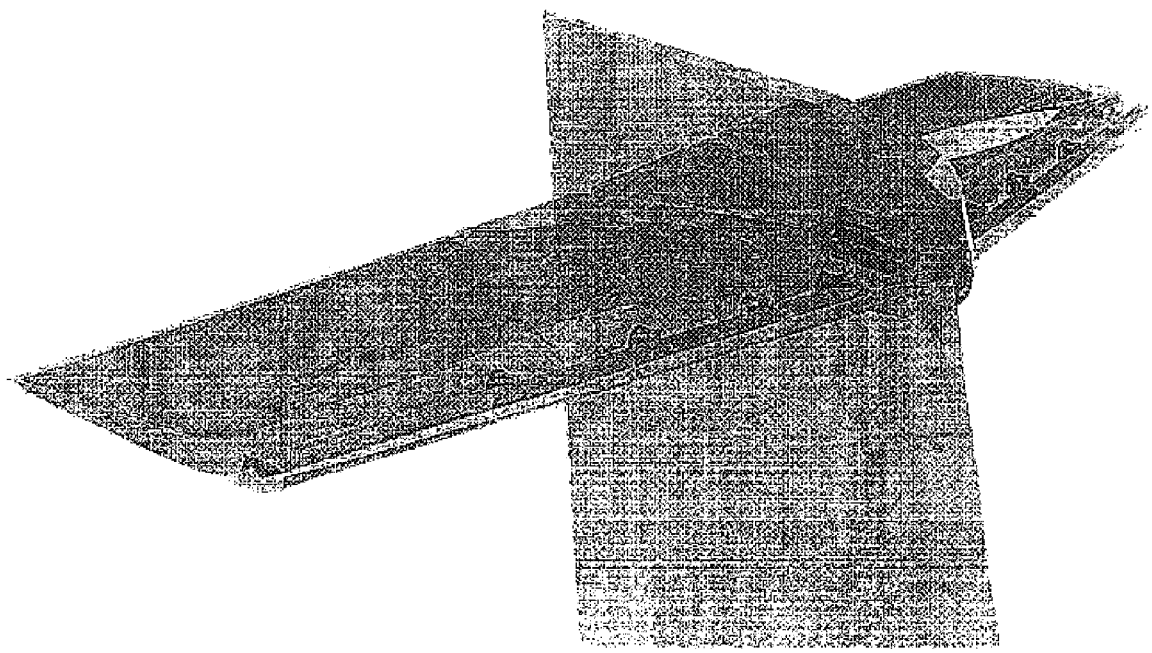
FIG. 1 shows an elevator and a rudder of an airplane in a perspective view wherein the microwave structure installation is indicated in the elevator.
Figure 3:
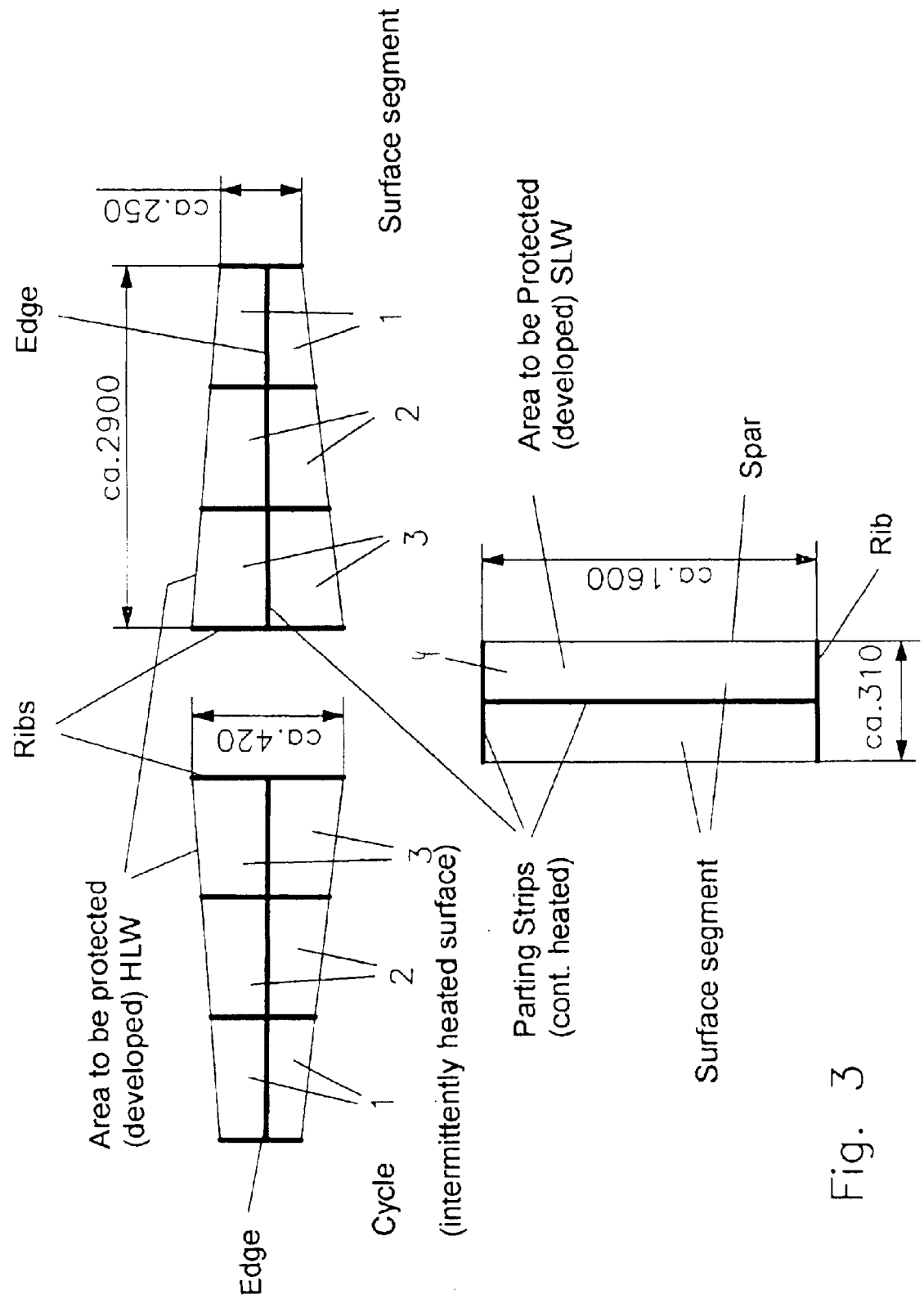
FIG. 3 shows the areas of the elevator and the rudder which are to be kept free of ice.

FIG. 1 shows the elevator and the intersection with the rudder. In the elevator, the microwave structure is indicated. It is not indicated in the rudder although it is present also there as indicated in FIG. 3. In the elevator two areas with microwave structures are shown which are mirror-reversed with respect to each other on the basis of the rudder. Each area is divided into four surface areas. This is indicated by the four aligned tubular uncoupling structures to which, at their ends nearer the rudder, the respective microwave sources are connected. The microwave source employed is in this case, as shown in FIG. 3, a magnetron whose microwave power output satisfies the heating requirements of the wall of the respective surface segment for a sufficiently rapid heating of the metal skin thereof. The waste heat of the magnetron can be determined from its efficiency, which is in the range of 0.4 to 0.8. The power supply for the microwave magnetron is dimensioned for the operating cycle with the highest power output.

Figure 2:
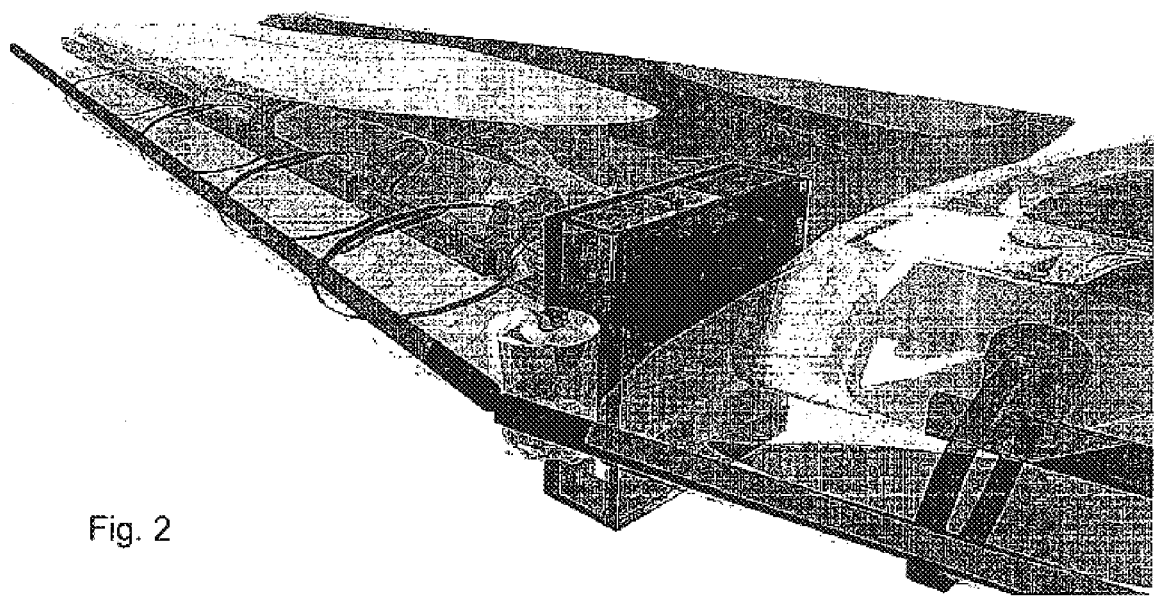
FIG. 2 shows the elevator with the microwave structure installed therein.

FIG. 2 shows the arrangement more clearly on a wing half of an elevator. The rudder is not shown in FIG. 2—it is removed. However, the power supply for the two areas in the elevator and for the rudder is shown between the two wings (see FIG. 3). Four hollow conductor-uncoupling structures are mounted on the wing strut extenders along the front edge of the wing at a certain distance therefrom. The thick double lines indicate the double ducts in the wing wall and with the branches at both sides from the leading edge rearwardly also indicate the surface segments of equal areas of the areas to be de-iced. The area around the lines is heated by the cooling circuit, such that it will always remain free from ice. As the double line branches off the leading edge also the wing ribs extend rearwardly within the wing so that they form, together with the struts and the wing wall segments, the respective chambers for the uncoupling arrangement. At the jointure line of the strut and the surface of the wing, the five double lines enter at both sides the wing: interior and are coupled, by way of hoses, to the cooling coil of the respective microwave source in such a way that the heat sources are arranged in the cooling circuit one after the other and the coolant flows in the double line branches and along the leading edge of the wings are oppositely directed. A particular coolant flow circuit is clearly shown in FIG. 4.

FIG. 3 shows schematically the arrangement for three line areas of an elevator and a rudder to be kept free of ice and the equal surface area segments which are associated therewith and which have to be made ice-free. The arrangement is shown tilted into a plane. The two elevator surfaces are arranged mirror reversed with respect to each other. They are—in contrast to the FIGS. 1 and 2—divided by the double-line branches only into three surface segments 1, 2 and 3 of equal area. The simple surface segment 4 shown centrally below the elevator surfaces represents the rudder.

The two thin lines delimiting the areas indicate the struts at the end of each area. The heavy lines indicate the division and consequently indicate the positions of the pipes or lines of the respective cooling circuit. In the elevator, the heavy centerline indicates the leading edge of the wing surface. In the rudder, this line extends vertically. The arrangement is for example that of a smaller type passenger airplane.

In addition to continuous heating of the structure along the heavy lines by way of the coolant pipes in the wing wall, a cyclical operation is selected in such a way that the two areas 1 with their sections at both sides of the leading edge are heated at the elevator by microwaves for example for 30 seconds. Subsequently, the areas 2, 3 and finally the area 4, that is the rudder, are heated. Then, the cycle is again started with the areas 1. That is, the cycle is 1, 2, 3, 4. When the two cycle areas 1 are heated, the other areas are not heated. As a result, during this time period of the cycle, only the two microwave sources for the surfaces segments 1, 2, thereafter the surface segments 2, 3 and finally the surface segment 4 are heated. Then the cycle starts again with the surface segment 1.

Figure 4:
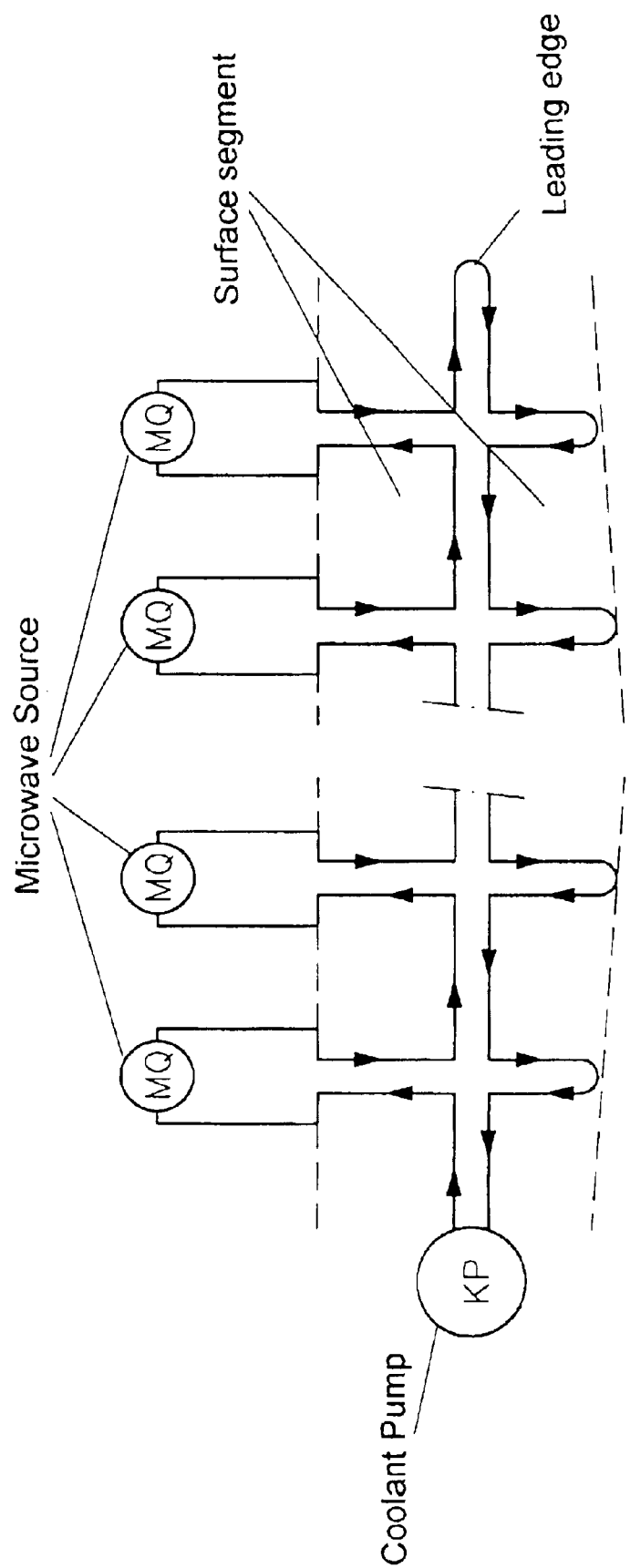
FIG. 4 shows a cooling circuit arrangement for the microwave sources.

A cooling circuit which includes at least one group of double lines and the associated microwave sources or, respectively, the heat sources thereof is shown in FIG. 4. The representation is schematically placed in a plane. It shows the double line area extending along the leading edge and the double line branches extending normally therefrom. The double line branches on one side are connected at one end and show the various microwave sources connected thereto. At an end of the center lines, a cooling pump KP is shown installed into the circuit. With this arrangement and the respective connections, the microwave sources are arranged in series which is advantageous. The double line arrangement includes forward and return lines. The double line branches, which lead to the microwave sources, extend to this end through the hollow body structure. There are two temperature differences which contribute to drive the coolant through the cooling circuit which are the $\Delta T_{MQ}$ at the cooling coil of the microwave source and the $\Delta T_{HW}$ during travel from the hollow body wall to the microwave source.

What is claimed is:

1. A microwave arrangement for de-icing and keeping ice-free hollow body structure surface areas which are subjected to meteorological influences of the atmosphere and which include leading edges that are exposed to air flow and consist of one of fiber compound materials including at least one of carbon fibers, and glass fibers and other fibers with additives providing for some electrical conductivity, and a metallic coating, each of said hollow body structures being microwave-tight, said arrangement including:

at least one power supply connected to an electrical source, at least one microwave source connected to said power supply provided for each hollow body structure, a hollow conductor connected to each microwave source for conducting microwaves to a predetermined area of a wall area of said hollow body structure for heating said wall area, said leading edges being divided into sections arranged adjacent one another and having surface segments of equal areas, said sections being formed between ribs, which extend normal to said leading edge and are firmly connected to said hollow body structure, said hollow body structures disposed side-by-side along the leading edge being sealed from each other in a microwave-tight manner by said ribs and spars, a hollow conductor uncoupling structure being mounted on said spars and extending therethrough for connection to said microwave source, the geometry of said hollow space and the frequency of said microwave generator being so selected that, in each hollow space, upon energization of the respective microwave source, an electromagnetic field in overmode state is generated for supplying equal amounts of heat to the walls of said segments of compound material for their excitation, metallic double conductors of an electrically conductive material being disposed along the leading edge and along end areas of said surface segments up to the spar and interconnected with the respective cooling circuit extending along the microwave sources and the leading edge so as to form a closed cooling circuit and providing in one of the double lines extending along the leading edge end the ribs a counter-current flow, said cooling coil being disposed in a series coolant flow arrangement.

2. A microwave arrangement according to claim 1, wherein said uncoupling structures have a round cross-section.

3. A microwave arrangement according to claim 2, wherein as microwave sources, based on the geometry of the area to be heated, the operating frequency and the power requirements, one of magnetrons, klystroms, backward wave oscillators, extended interaction oscillators, gyrotrons and klystodes are used.

4. A microwave arrangement according to claim 3, wherein the double lines of an area which are integrated into the fiber structure and through which coolant is conducted are, at least in the de-icing areas, metallic tubes of round or polygonal cross-section.

5. A microwave arrangement according to claim 4, wherein the cooling circuit includes at least the double lines and the microwave sources associated therewith for an area to be kept free of ice.

6. A microwave arrangement according to claim 5, wherein each cooling circuit includes a coolant-circulating pump.

7. A microwave arrangement according to claim 1, wherein said uncoupling structures have a rectangular cross-section in order to provide, in the hollow space in which said uncoupling structure is installed, a multi mode excitation in addition to the base mode.

8. A method of de-icing and keeping the surfaces of hollow body structures free of ice which structures are exposed to atmospheric influences and which have leading edge areas which consist of fiber compound material, said edge areas consisting of a fiber reinforced material provided at its outer exposed surface with a metallic material coating and each of said hollow body structures being microwave-tight, and wherein each of said hollow body structures includes at least a power supply connected to an electrical energy source, at least one microwave source operable by said power supply, a hollow conductor connected to said at least one microwave source, for conducting microwave energy to a wall area of said hollow body in order to heat said wall area, said wall area being divided into equal surface sections disposed adjacent one another along said leading edge and being defined by ribs extending normally from the leading edge in the hollow body structure in spaced relationship and further by spars extending parallel to said leading edge so as to form microwave-tight chambers, and an uncoupling conductor structure supported in each chamber on said spars in a position parallel to said front edge and being connected to said microwave source, with the geometry of the chamber and the frequency of the microwaves being selected so that in each chamber an electromagnetic field with excess modes is generated when the microwave source is switched on for uniform heating of the equal-size surface segments of fiber reinforced material, metallic double lines of conductive material extending in the area to be kept ice free along the leading edge and forming, together with cooling coils of said microwave sources, a cooling circuit with the coolant in the double lines flowing in opposite directions and the cooling coils of said microwave sources being arranged in a series circuit, said method comprising the steps of: maintaining the coolant flow through the cooling circuit for a certain area of the equally sized surface segments along the leading edge in order to maintain the structure along the double line free of ice, operating said microwave sources mounted in said hollow spaces such that, within a cycle period, at least one microwave source is operated while the others are shut down such that, between two operative microwave sources, there is another one which is shut down, and operating each microwave source which is in operation selectively continuously or in a pulsed manner for controlling the heat input into the respective surface segment.

9. A method according to claim 8, wherein, at least initially, each of the coolant pumps installed in said cooling circuits is operated for circulating the coolant through the microwave sources and through the cooling circuit for heating and de-icing the surface areas adjacent the cooling circuit.

\* \* \* \* \*